United States Patent [19]

Hayashi

[11] 4,099,113
[45] Jul. 4, 1978

[54] NUMERICAL CONTROL SERVO SYSTEM
[75] Inventor: Shigeki Hayashi, Tokyo, Japan
[73] Assignee: Nusco Kabushiki Kaisha, Tokyo, Japan
[21] Appl. No.: 694,876
[22] Filed: Jun. 11, 1976
[30] Foreign Application Priority Data
Jun. 16, 1975 [JP] Japan .................. 50-73351
[51] Int. Cl.² ........................ G05D 23/275
[52] U.S. Cl. .................. 318/632; 318/561; 364/118
[58] Field of Search .......... 318/561, 632, 616, 618; 235/151.11; 364/118

[56] References Cited
U.S. PATENT DOCUMENTS

| 3,512,060 | 5/1970 | Floyd | 318/616 |
| 3,757,188 | 9/1973 | Brewer et al. | 318/632 |
| 3,917,930 | 11/1975 | Davey et al. | 235/151.11 |

Primary Examiner—B. Dobeck
Assistant Examiner—John J. Feldhaus
Attorney, Agent, or Firm—Pollock, Vande Sande & Priddy

[57] ABSTRACT

A numerical control servo system, in which a set value in a setting memory and a measured numerical value corresponding to a controlled variable are subtracted one from the other by means of a digital subtractor and an object to be controlled is controlled based on the subtracted value in a manner to reduce the subtracted value to zero, such a control being repeatedly performed. Prior to each control, the output from the digital subtractor at the end of an immediately preceding control is written in a deviation memory. During the control, the value stored in the deviation memory is added directly or indirectly to the set value to compensate for the controlled deviation.

6 Claims, 6 Drawing Figures

NUMERICAL CONTROL SERVO SYSTEM

BACKGROUND OF THE INVENTION

This invention relates to a numerical control servo system which calculates a difference between a set numerical value and a measured numerical value corresponding to a controlled variable and performs a control based on the result of the calculation in a manner to reduce the difference to zero, and more particularly to a numerical control servo system which repeatedly carries out such a control.

In conventional types of numerical control servo systems, since the gain of a feedback control loop cannot be made infinity, a controlled deviation is produced. Therefore, for example, in the case where a number to be cut is fed by a predetermined length under the control of the numerical control servo system and cut into the predetermined length, an error corresponding to the abovesaid controlled deviation is introduced in the length of each severed member. In addition, the controlled deviation gradually changes with the lapse of time due to a drift of a digital-to-analog converter provided in the control system. This makes it impossible to set a numerical value in anticipation of the abovesaid controlled deviation, which results in a defect that the controlled deviation undergoes a gradual change.

An object of this invention is to provide a numerical control servo system which is capable of reducing the controlled deviation sufficiently small or to zero.

SUMMARY OF THE INVENTION

According to this invention, the difference between a set numerical value and a measured one corresponding to a controlled variable in an immediately preceding control, that is, a controlled deviation at the end of the preceding control, is written in a deviation memory before the start of each control and the numerical value written in the deviation memory is added to the set numerical value. This addition may be such that the above numerical value is added to the set numerical value eventually. For example, it is also possible to subtract only the numerical value stored in the deviation memory from the measured numerical value and to supply the subtracted result to a subtractor which performs a substraction of the subtracted result and the set numerical value one from the other. In this manner, compensation for a preceding controlled deviation is made at every control to ensure a correct control.

DESCRIPTION OF THE PREFERRED EMBODIMENTS

Figure 1:
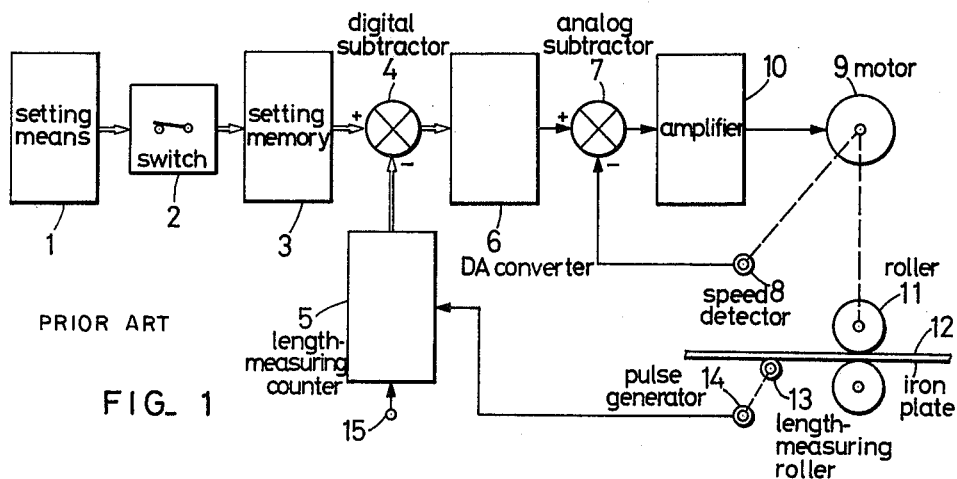
FIG. 1 is a block diagram showing a conventional numerical control servo system.

To facilitate an understanding of this invention, a conventional numerical control servo system will be described first in connection with FIG. 1. A numerical value set by setting means 1 is transferred by a control of a switch 2 to a setting memory 3. The numerical value in the setting memory 3 is supplied to a digital subtractor 4 to obtain a difference between the numerical value and a measured numerical value fed thereto from a length-measuring reversible counter 5. The numerical value of this difference is converted by a D-A converter 6 into an analog quantity, which is applied to an analog subtractor 7, in which a difference is obtained between the analog quantity and a voltage fed from a speed detector 8 corresponding to the speed of a motor 9. The output from the analog subtractor 7 is supplied through an amplifier 10 to the motor 9 to drive it. With the rotation of the motor 9, a roller 11 is driven, by which a member to be controlled 12 such, for example, as an iron plate, is transferred. As the iron plate 12 is moved, a length-measuring roller 13 disposed in rotary contact with the iron 12 is rotated, by which a number of pulses corresponding to the distance of travel of the iron plate 12 is generated from a length-measuring pulse generator 14. The pulses from the pulse generator 14 are counted by length-measuring counter 5. The counter 5 is reset by a reset signal from a terminal 15 at the start of the control operation. Accordingly, the value counted by the counter 5, i.e., the measured value of the distance of travel of the iron plate 12, and the numerical value set in the setting memory 3 are compared by the subtractor 4 with each other to derive a subtracted output from the subtractor 4 until the measured value reaches the set value. And the subtracted output is converted into an analog quantity, by which the rotation of the motor 9 is controlled. Thus, the iron plate 12 can be transported by the set value.

In such a numerical control servo system, since the gain of the feedback control loop cannot be made infinity, a controlled deviation results and the control operation is stabilized in spite of disagreement of the counted value by the counter 5 with the set value. Consequently, in the case where the iron plate 12 is cut into desired length corresponding to the set value by the employment of such a numerical control servo system, the length of each severed plate differs corresponding to the abovesaid controlled deviation. For the compensation of such a controlled deviation, it is considered to preselect the set value in anticipation of the deviation. However, the controlled deviation gradually changes due to a drift of the D-A converter 6 of the like with the lapse of time and, further, it changes with variations in the load of the motor 9 depending upon the quality of the iron plate 12 used. Consequently, even if the set value is previously corrected to a certain degree, the controlled deviation cannot be reduced sufficiently.

Figure 2:
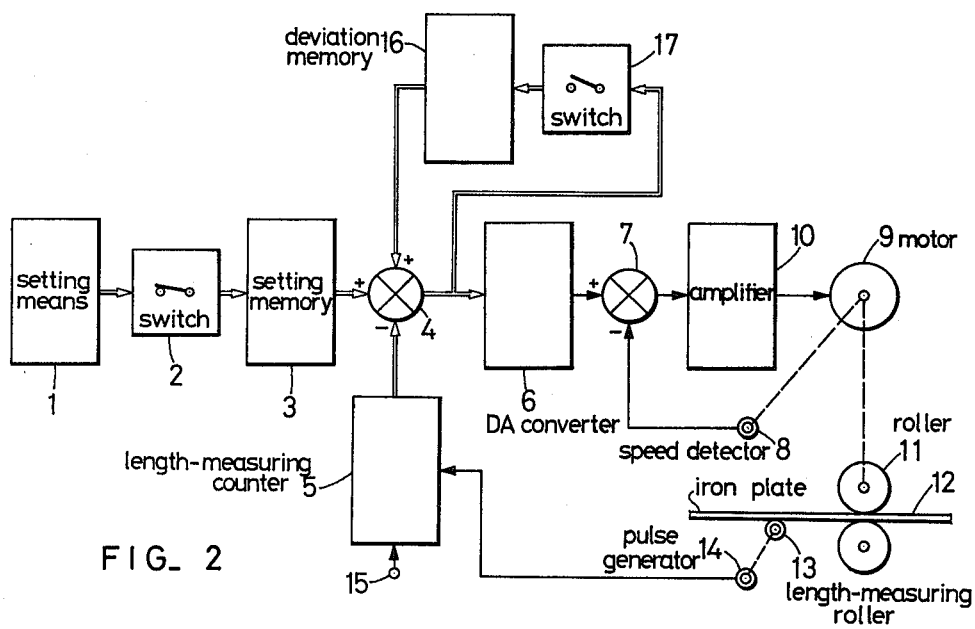
FIG. 2 is a block diagram illustrating one example of a numerical control servo system according to this invention.

FIG. 2 illustrates one example of the numerical control servo system according to this invention. In FIG. 2, parts corresponding to those in FIG. 1 are identified by the same reference numerals. In accordance with this invention, a deviation memory 16 is provided, into which an output value of the subtractor 4 is written before the start of the control. For example, in the case of transferring the iron plate 12 for cutting it into set-value length as described above, a write control signal is produced a little earlier than the generation of the reset signal at the terminal 15 at the start of a control after the preceding cutting of the iron plate. By the write control signal, a switch 17 is temporarily closed to connect the output side of the subtractor 4 with the deviation memory 16 to write therein a numerical value of the output from the subtractor 4 at that time, that is, the controlled deviation in an immediately preceding control. The numerical value written in the deviation memory 16 is supplied to the subtractor 4 for the addition to the set value therein. The controlled, deviation may be written in deviation memory 16 by controlling the switch 17 as described above but it is also possible to employ a so-called latch circuit as the deviation memory 16 and to so adapt such a construction that when a write pulse is applied to the latch circuit, the content of the subtractor 4 is latched in the deviation memory 16. Further, the write pulse and the reset pulse applied to the terminal 15 may be, for example, sequentially phase-shifted pulses which are derived from a control signal generator driven by a start signal.

With such an arrangement at depicted in FIG. 2, the controlled deviation in the immediately preceding control is written in the deviation memory 16 during each control and the numerical value written in the deviation memory 16 is added to the set value in the control, so that the controlled deviation is compensated. Since the controlled deviation is detected in each control, even if the controlled deviation changes due to variations in the load or gradually changes due to a drift, a control of small or no controlled deviation is carried out at all times.

Figure 3:
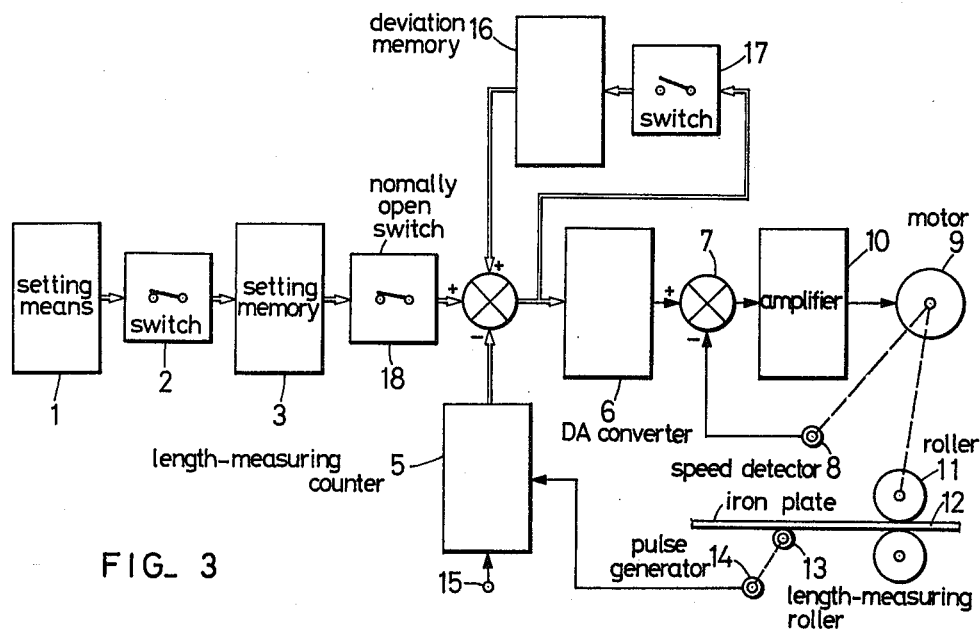
FIG. 3 is a block diagram showing another example of the numerical control servo system according to this invention.

In the case of cutting the iron plate 12 into a certain length as mentioned above, when pulses are generated from the pulse generator 14 under the influence of mechanical vibration of the iron 12 by the cutting operation, they are counted by the counter 5 even if they are small. Accordingly, there is the possibility that the controlled deviation obtained in the substractor 4 is changed. In such a case, it is arranged that the cutting operation is achieved after the controlled deviation remaining in the substractor 4 is written in the deviation memory 16 upon stopping the feeding of the iron plate 12. For example, as shown in FIG. 3 in which parts corresponding to those in FIG. 2 are indicated by the same reference numerals, a normally open switch 18 is connected in series between the setting memory 3 and the subtractor 4. When a cutter blade starts to fall for cutting the iron plate after stopping of the iron plate, it is detected by a limit switch and, by its detecting output, the switch 17 is closed to write the output from the subtractor 4 in the deviation memory 16 and thereafter the switch 18 is opened and the counter 5 is reset. After the cutting operation, upward movement of the cutter blade is detected by another limit switch and, by its detecting signal, the switch 2 is closed to newly write the set value in the setting memory 3 and then the switch 18 is closed to start the next control operation and, at the same time, the switch 2 is opened.

In this way the controlled deviation is written in the deviation memory 16 before being subjected to an external disturbance resulting from the cutting operation and, immediately after writing of the controlled deviation, the switch 18 is opened and the counter 5 is reset and a positioning control during cutting is continued. That is, the control loop is maintained closed to hold the iron plate 12 at its controlled position, but during cutting, if the iron plate 12 is shifted by the cutting operation, it is detected by the length-measuring counter 5 to produce an output from the subtractor 4, thus correcting the above shift. In the next control, the length-measuring counter 5 starts counting without being reset.

Figure 4:
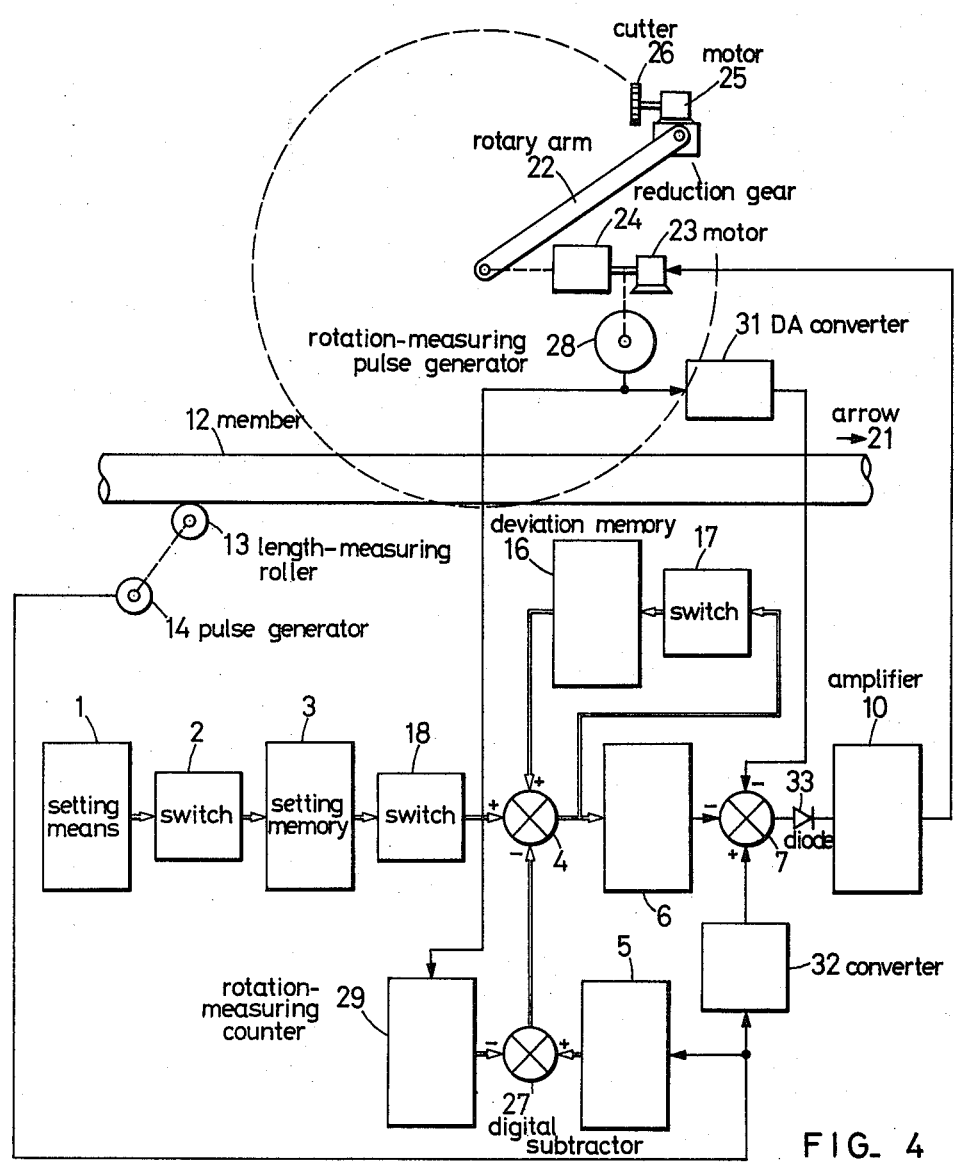
FIG. 4 is a block diagram illustrating one part of a modified form of the numerical control servo system according to this invention.

Referring now to FIG. 4, one embodiment of this invention will be described as applied to a rotary type flying cutter. In this case, the member 12 to be cut is such, for example, as a pipe, which is driven in its lengthwise direction as indicated by the arrow 21. In FIG. 4, means for driving the member to be cut is not shown. For cutting the member 12, a rotary arm 22 is provided which is rotatable about one end thereof and this rotary arm 22 is driven by a motor 23 through a reduction gear 24. At the other end of the rotary arm 22, a motor 25 is mounted in such a manner as to assume the same posture at all times and a cutter 26 is mounted on the rotary shaft of the motor 25.

As the rotary arm 22 rotates, the cutter 26 is brought into contact with the member 12 in a direction which is substantially parallel with the direction of its travel and in which the member 12 is to be cut. In this case, the distance of travel of the member 12 is measured and when the measured value reaches a set value, cutting of the member 12 is carried out. To this end, the rotation of the cutter 26 is controlled such that when the travelling speed of the member 12 changes, the revolving speed of the cutter 26 is adjusted correspondingly to urge the cutter 26 against the member 12 at a position corresponding to the set value. Even when the cutter 26 is urged against the member 12 at the predetermined position, if the travelling speed of the cutter 26 in the direction of travel of the member 12 is not in agreement with the travelling speed of the member 12, the cutter 26 may be broken or the member 12 is cut aslant. To avoid this, the movement of the cutter in the direction of travel of the member 12 and the movement of the member 12 are controlled while the cutter 26 is in contact with the member 12 for cutting the latter.

A length-measuring roller 13 is held in rotary contact with the member 12 and by the rotation of the roller 13, a length-measuring pulse generator 14 is driven to generate, for example, 10 pulses when the member 12 shifts 1 mm. The pulses are counted by the length-measuring counter 5. The value counted by the counter 5 is indicative of the distance of travel of the member 12. This counted value is supplied to a digital subtractor 27. On the other hand, by the rotation of the motor 23, a rotation-measuring pulse generator 28 is driven and pulses derived therefrom are counted by a rotation-measuring 29. The counter value counted by the counter 29 indicates the distance of the rotational movement and angular position of the cutter 26. This counted value is supplied to the digital subtractor 27 and subtracted from the set length.

The resulting subtracted value corresponds to the remaining length with respect to the set length and is converted by the D-A converter 6 into an analog signal. The converted output is supplied to the analog subtractor 7. Output pulses from the rotation-measuring pulse generator 28 are supplied to a D-A converter 31 and converted thereby into an analog voltage corresponding to the revolving speed of the rotary arm 22, thereafter being supplied to the subtractor 7. Further, pulses from the length-measuring pulse generator 14 are converted by a converter 32 into an analog voltage corresponding to the travelling speed of the member 12 and the analog voltage is supplied to the subtractor 7. As a result of this, the revolving speed signal and the remaining-length signal are subtracted from the member-travelling-speed signal and the resulting difference is applied through a diode 33 to a servo amplifier 10 and by the output therefrom, the motor 23 is driven.

Where the length set in the setting memory 3 is sufficiently long, the remaining-length signal from the D-A converter 6 is larger than the travelling speed signal from the converter 32 and the output from the subtractor 7 is negative and, due to the presence of the diode 33, the motor 23 is not driven. When the member 12 runs an appreciable length and the remaining-length signal becomes small and the output from the subtractor 7 becomes positive, the output from the servo amplifier 10 is supplied to the motor 23 to start the rotation of the rotary arm 22. After one rotation of the rotary arm 22, the cutter 26 assumes its initial position again. This implies that the cutter 26 does not ever shift eventually with respect to the travelling of the member 12. However, since the servo control is applied so that the cutter 26 may rotate in concert with travelling of the member 12, the rotation-measuring pulse is subtracted from the length-measuring pulse, in other words, the number of rotation-measuring pulses generated during one rotation of the cutter 26 is subtracted from the number of length-measuring pulses. But, instead, the length preset in the setting memory 3 is selected to be smaller than a desired length corresponding to the number of pulses during one rotation of the cutter 26.

The state of the cutter 26 immediately before its contact with the member 12 is detected, for example, by a limit switch and the output from the subtractor 4 at that time is written in the deviation memory 16 and, immediately thereafter, the switch 18 is turned off. When the cutter 26 has returned to its initial position after one rotation of the rotary arm 22 to have cut the member 12, the rotary arm 22 is automatically stopped. Also in this case, the deviation signal is written in the deviation memory 16 to compensate for the next control, thus providing for reduced control error. Although the above embodiment of this invention has been described in connection with the rotary type flying cutter, the invention can be similarly applied to a reciprocating type flying cutter.

Figures 5, 6:
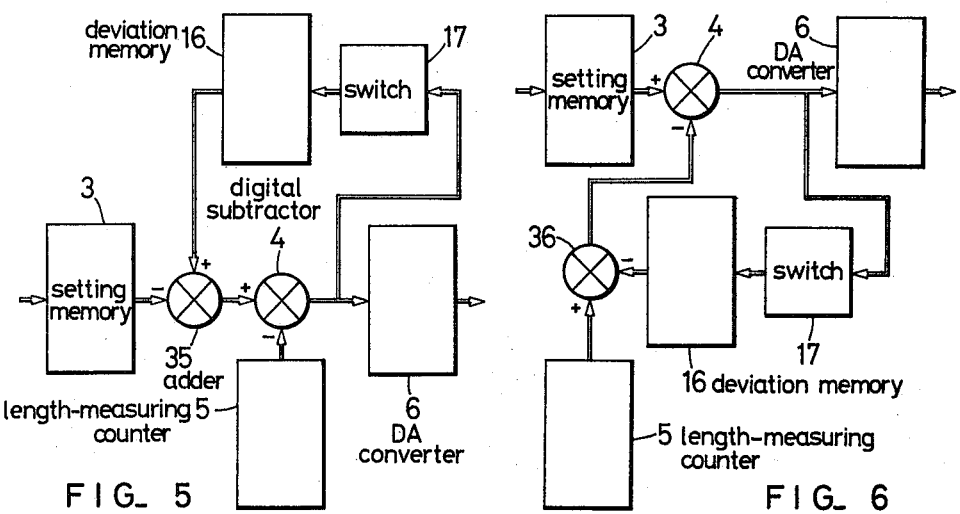
FIG. 5 is a block diagram showing one part of another modified form of the numerical control servo system according to this invention.
FIG. 6 is a block diagram showing an example of the numerical control servo system of this invention as being applied to a rotary type flying cutter.

In the foregoing, it is sufficient that the numerical value stored in the deviation memory 16 is added to the set numerical value eventually. It is also possible to employ a construction of the type partly shown in FIG. 5 in which an adder 35 is provided, to add numerical value in the deviation memory 16 to a set numerical value and the added value is supplied to the subtractor 4. The adder 25 may also be provided on the output side of the subtractor 4 and, in this case, the numerical value in the deviation memory 16 is added to the output from the subtractor 4. Further, it is also possible to adopt a construction of the type partly shown in FIG. 6 in which another subtractor 36 is provided, the value counted by the counter 5 is subtracted thereby, and the subtracted value is supplied to the subtractor 4. Moreover, the deviation signal is not always positive and in the case where it is negative, the numerical value in the deviation memory 16 is eventually subtracted from the set numerical value.

This invention is applicable to servo loops of the type which control not only cutting of the member 12 but also shifting, measurement of lengths, the amount of rotation and so on of other articles in accordance with the difference between a set numerical value and a measured value corresponding to the control. Accordingly, it is also possible to employ a construction which does not require conversion of the output from the subtractor 4 into an analog quantity and effects a control with the output held in the form of a digital signal. The set value does not always remain constant throughout one control operation but may change during the operation but, in such a case, the numerical value in the deviation memory 16 is held unchanged until the control operation is finished.

It will be apparent that many modifications and variations may be effected without departing from the scope of the novel concepts of this invention.

What is claimed is:

1. A numerical control servo system comprising:
   a setting memory for setting a set numerical value indicative of the amount by which a movable member to be controlled should be shifted in position;
   means including a motor for shifting the position of said movable member;
   a pulse generator for generating a pulse each time said member is shifted a predetermined distance;
   a length-measuring counter for counting the pulses from said pulse generator to a measured numerical value;
   a digital subtractor for obtaining a difference between the set numerical value and the measured numerical value from said length-measuring counter;
   a D-A converter for converting the difference output from said digital subtractor into an analog speed reference signal;
   means for obtaining another analog signal corresponding to the shift speed of said movable member;
   an analog subtractor for obtaining a difference between said analog shift speed signal and said analog speed reference signal;
   means for controlling said motor in response to the output from the analog subtractor to shift the position of said member so that the output from the digital subtractor approaches zero;
   a deviation memory for writing therein the output from the digital subtractor at the start of the control operation; and
   correcting means for correcting directly or indirectly the set numerical value in accordance with the value stored in the deviation memory.

2. A numerical control servo system according to claim 1, wherein the correcting means is the digital subtractor and the numerical value in the deviation memory is selected to have such a polarity that it is added to the set numerical value.

3. A numerical control servo system according to claim 1, wherein the correcting means is a digital adder for adding together the set numerical value in the setting memory and the numerical value stored in the deviation memory and the added output from the digital adder is supplied to the digital subtractor.

4. A numerical control servo system according to claim 1, wherein the correcting means is another digital subtractor for obtaining a difference between the numerical value stored in the deviation memory and the measured numerical value and the output from the digital subtractor is supplied to the digital subtractor.

5. A numerical control servo system according to claim 1 wherein the member to be controlled is an object moved in its lengthwise direction relative to a cutter performing a rotational movement, and which further includes a rotation-measuring pulse generator for generating a pulse at each rotational movement of the cutter through a unit distance, a rotation-measuring counter for counting the pulses from said rotation-measuring pulse generator, another digital substractor for obtaining a difference between the values counted respectively by the rotation-measuring counter and by the length-measuring counter to obtain the measured numerical value, another D-A converter for converting the pulses from the length-measuring pulse generator into an analog quantity to obtain an analog signal corresponding to the traveling speed of the member to be controlled, and another D-A converter for converting the pulses from the rotation-measuring pulse generator into an analog quantity to obtain an analog signal corresponding to the rotating speed of the cutter, the analog signal corresponding to the traveling speed of the member to be controlled and the analog signal corresponding to the rotating speed of the cutter being supplied to the analog subtractor.

6. A numerical control servo system according to claim 1 wherein said movable member is shifted in position to permit said member to be worked upon, said system further including means for writing the output from the digital subtractor into the deviation memory after the output from the digital subtractor becomes unchanged and before said member is worked, thereby to provide a zero set numerical value to the digital subtractor and to reset the length-measuring counter to zero.

* * * * *